(12) United States Patent
Craft et al.

(10) Patent No.: US 9,958,054 B2
(45) Date of Patent: May 1, 2018

(54) SHIELD FOR TRANSMISSION FLUID SUMP (71) Applicant: Eaton Corporation, Cleveland, OH (US)

(72) Inventors: Robert B. Craft, Ceresco, MI (US); Michael C. Weddington, Paw Paw, MI (US)

(73) Assignee: Eaton Corporation, Cleveland, OH (US)

( * ) Notice: Subject to any disclaimer, the term of this patent is extended or adjusted under 35 U.S.C. 154(b) by 833 days.

(21) Appl. No.: 14/289,783

(22) Filed: May 29, 2014

(65) Prior Publication Data

US 2014/0353087 A1 Dec. 4, 2014

Related U.S. Application Data (60) Provisional application No. 61/828,218, filed on May 29, 2013.

(51) Int. Cl.
*F16H 57/04* (2010.01)

(52) U.S. Cl.
CPC ..... *F16H 57/0449* (2013.01); *F16H 57/0453* (2013.01)

(58) Field of Classification Search
CPC . F16H 57/0449; F16H 57/0453; F16N 19/006
USPC .......................... 184/6.27; 74/606 R; 180/346
See application file for complete search history.

(56) References Cited

U.S. PATENT DOCUMENTS

| | | | | | |
|---|---|---|---|---|---|
| 4,256,069 | A | * | 3/1981 | Masuda | F01M 11/12 123/196 S |
| 4,258,679 | A | * | 3/1981 | Leitermann | F01M 5/007 123/196 AB |
| 4,270,497 | A | * | 6/1981 | Valerio | F01M 11/0004 123/195 C |
| 5,404,964 | A | * | 4/1995 | Zinsmeyer | F04D 25/02 184/13.1 |
| 5,678,461 | A | * | 10/1997 | Stine | F01P 3/20 184/6 |
| 5,813,493 | A | * | 9/1998 | Sloan | F01M 13/0011 184/106 |
| 6,105,611 | A | * | 8/2000 | Ando | B60T 11/26 137/558 |
| 6,948,606 | B2 | * | 9/2005 | Ida | F16H 57/0436 184/6.27 |

(Continued)

FOREIGN PATENT DOCUMENTS

WO 9641136 A1 12/1996

*Primary Examiner* — William E Dondero
*Assistant Examiner* — Mark K Buse
(74) *Attorney, Agent, or Firm* — RMCK Law Group PLC (57) ABSTRACT A transmission has a float level sensor in a fluid sump of the transmission case. A shield having a first panel and a second panel connected to and generally perpendicular with the first panel. The first panel cooperates with a first wall of the transmission case in the sump. The second panel cooperates with a second wall and a bottom wall of the transmission case in the sump. The first and second panels are adapted to cooperate with the first wall, the second wall, and the bottom wall of the transmission case to form a generally stagnant well within the fluid sump surrounding the fluid level sensor to decrease fluid motion adjacent to the sensor. The generally stagnant well and the sump are in fluid communication with one another.

17 Claims, 6 Drawing Sheets

(56) References Cited

U.S. PATENT DOCUMENTS

| | | | | |
|---|---|---|---|---|
| 7,654,241 | B2* | 2/2010 | Kobayashi | F01M 5/001 123/195 C |
| 8,020,666 | B2* | 9/2011 | Yamashita | F01M 11/0004 184/106 |
| 9,175,585 | B2* | 11/2015 | McGowan | B60K 35/00 |
| 2013/0125809 | A1* | 5/2013 | Gracyalny | G01F 23/58 116/228 |

* cited by examiner

SHIELD FOR TRANSMISSION FLUID SUMP

CROSS-REFERENCE TO RELATED APPLICATIONS

This application claims the benefit of U.S. provisional application Ser. No. 61/828,218 filed May 29, 2013, the disclosure of which is hereby incorporated in its entirety by reference herein.

TECHNICAL FIELD

Various embodiments relate to a fluid sump in a transmission.

BACKGROUND

Transmissions, such as vehicle transmissions, have one or more gear meshes that selectively transfer torque from an input shaft to an output shaft of the transmission. The gear meshes are lubricated during transmission operation, and transmission fluid is commonly used as the lubricant. The gear meshes and the lubricating fluid are contained within a transmission case or housing, and a sump may be provided at the bottom of the transmission case to collect the fluid and act as a reservoir. Transmissions may be provided with a sight glass visible from outside the transmission housing where the fluid level within the transmission may be visually checked when the transmission and vehicle are at rest, for example, with the engine not running. Alternatively, the fluid level in the transmission may be manually checked by inserting a dip stick, or the like, into the fluid fill port of the transmission housing to check the fluid level when the transmission and the vehicle are at rest.

SUMMARY

According to an embodiment, a transmission is provided with a transmission case forming a main sump for transmission fluid with a corner region formed by a bottom wall, a first side wall and a second side wall of the case. A float level sensor assembly is supported within the corner region by one of the first and second side walls of the case. A shield is positioned within the main sump and has a first panel with an edge positioned adjacent to the bottom wall. The shield has a second panel connected to the first panel and opposed to the edge of the first panel. The second panel extends from the first panel towards the first side wall. The sensor assembly is positioned between the first panel and the first side wall and between the second panel and the bottom wall. The shield partitions a secondary sump into the main sump and surrounds the sensor to decrease fluid motion adjacent to the sensor assembly. The secondary sump is in fluid communication with the main sump by fluid flow between the shield and the case.

According to another embodiment, a transmission is provided with a transmission case forming a main sump for transmission fluid with a corner region formed by a bottom wall, a first side wall, and a second side wall of the case. The case has an arch adjacent to the corner region that extends from the bottom wall to the first side wall. A float level sensor assembly is positioned within the transmission case and supported by one of the first and second side walls. A shield is supported by the arch and has first and second panels. The first panel is sized to substantially cover a first region defined by the arch, the bottom wall, and the first side wall. The second panel is sized to substantially cover a second region defined by the arch, the bottom wall and the second side wall. The shield forms a secondary sump within the main sump and about the sensor to decrease fluid motion adjacent to the sensor. The secondary sump is in fluid communication with the main sump.

According to yet another embodiment, a shield is provided for use with a float sensor in a fluid sump of a transmission case. The shield has a first panel for cooperation with a first wall of the transmission case in the sump. The shield also has a second panel connected to and generally perpendicular with the first panel. The second panel for cooperation with a second wall and a bottom wall of the transmission case in the sump. The first and second panels are adapted to cooperate with the first wall, the second wall, and the bottom wall of the transmission case to form a generally stagnant well within the sump surrounding a fluid level sensor. The sensor is supported by one of the first and second walls and positioned within the well.

Various embodiments of the present disclosure have associated, non-limiting advantages. For example, a sensor is positioned within a sump of the transmission to provide a signal corresponding to a transmission fluid level in the transmission to a user during operation. A shield having first and second panels is positioned around the sensor to provide a stagnant or semi-stagnant region or secondary sump in the sump about the sensor, thereby reducing sensor error and increasing sensor accuracy. The shield forms a gap with a wall of the transmission case to provide a passage for fluid flow from the main sump into the secondary sump. The gap may be sized such that fluid at low operating temperatures and high viscosity generally does not flow through the gap to reduce the effects of a vortex adjacent to the sensor and formed by a pump inlet. The shield reduces turbulence and sensor error caused by the vortex splash, slosh, and aeration.

DETAILED DESCRIPTION

As required, a detailed description of the embodiments of the present disclosure are provided below; however, it is to be understood that the disclosed embodiments are examples of the invention that may be embodied in various and alternative forms. The figures are not necessarily to scale; some features may be exaggerated or minimized to show details of particular components. Specific structural and functional details disclosed herein are not to be interpreted as limiting, but merely as a representative basis for teaching one skilled in the art how to practice the present invention.

Figure 1:
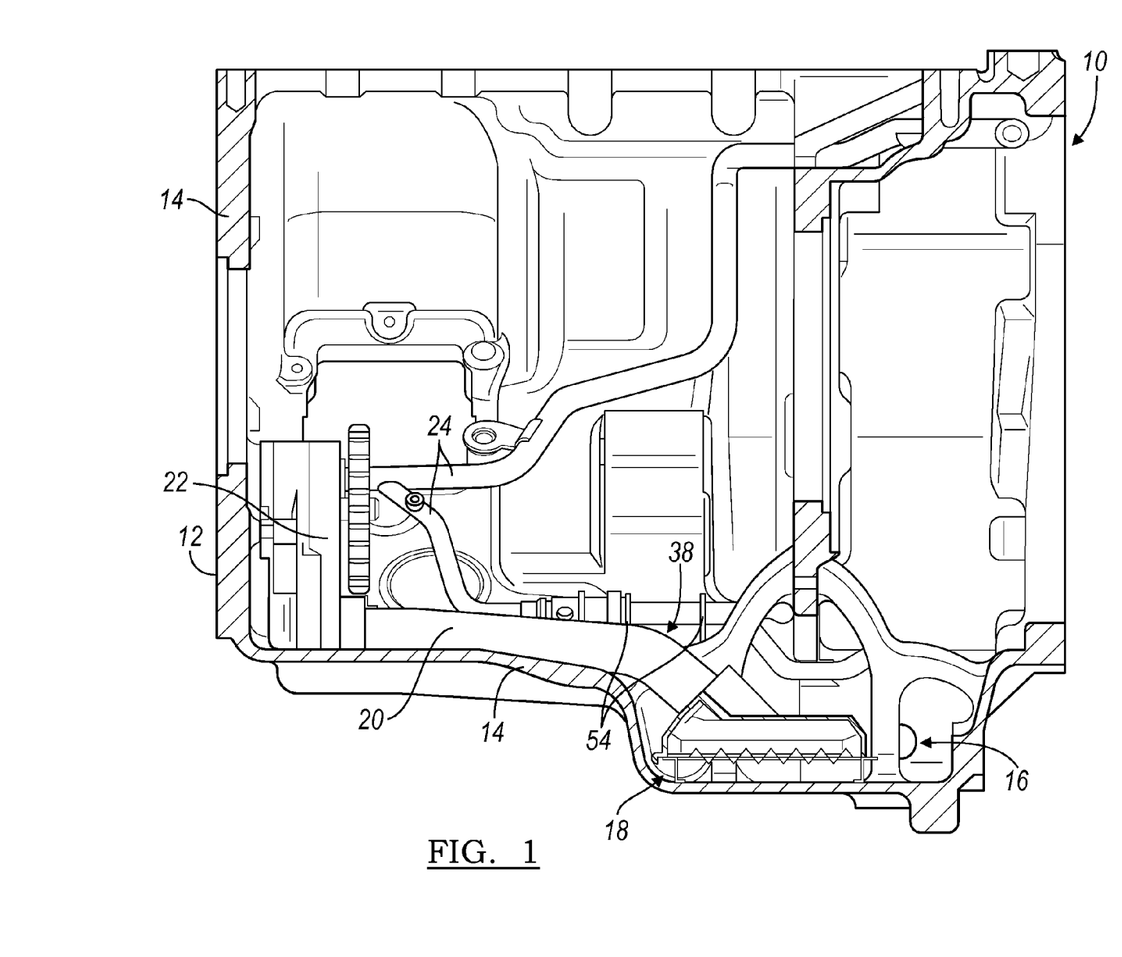
FIG. 1 is a partial sectional side view of a transmission according to an embodiment.

FIG. 1 illustrates a side view of a transmission 10 according to an embodiment and having a front face 12. The transmission 10 has a case 14 or housing. The case 14 may be made from one or more castings, forgings or other components, and encloses a meshed gear train of the transmission and lubricating transmission fluid for the transmission. The transmission 10 may be a twin countershaft transmission, a single countershaft transmission, a dual clutch transmission, or other transmission as is known in the art. The transmission 10 may contain meshed gear trains and/or planetary gear sets, and may include an auxiliary transmission unit in some examples.

The case 14 for the transmission 10 forms a main sump 16. The sump 16 collects transmission fluid, or "oil", and acts as a reservoir for the transmission 10. In one example, the sump 16 is a semi-dry sump or a wet sump. The fluid is used to lubricate the gear meshes within the transmission 10 to reduce friction and maintain an operating temperature. The fluid in the sump 16 flows through an inlet 18 to tubing 20 connected with a pump 22. The inlet 18 may include a strainer, and uses suction provided by the pump 22 to deliver fluid to the pump 22.

The pump 22 has an outlet that is connected to lubrication distribution tubes 24 that direct lubricating fluid to the gear meshes and other locations in the transmission housing 14.

Figure 2:
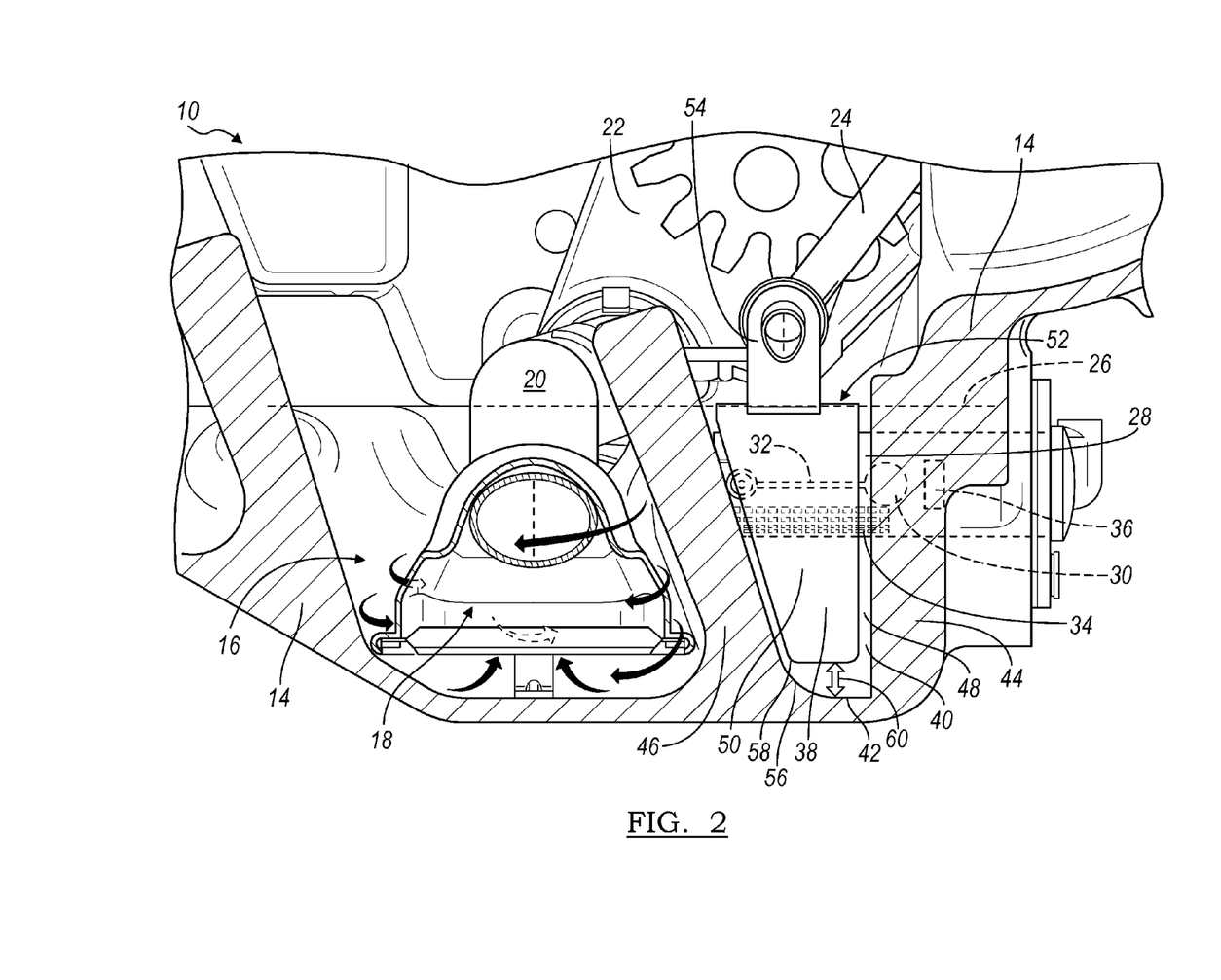
FIG. 2 is a partial sectional rear view of the transmission of FIG. 1.

FIG. 2 illustrates a partial sectional view of the transmission 10 towards the front of the transmission and illustrates the sump 16. The sump 16 acts as a reservoir for lubricating fluid for the transmission 10. When the fluid level is "full" for the transmission 10, the level in the sump 16 may be approximately at the dashed line 26 when the transmission 10 is operating. The sump 16 is formed by interior walls of the case 14.

A fluid level sensor assembly 28 is provided within the sump 16 and is used to sense the fluid level in the transmission 10 while the transmission is operating. In one example, the sensor assembly 28 includes a float 30 on a pivot arm 32 (both shown in phantom). The arm 32 is pivotally attached to a sensor housing 34. The sensor housing 34 is ventilated and has a plurality of apertures that allow for fluid flow into the interior of the housing 34 to interact with the float 30. The float is buoyant in the transmission fluid and has a magnet. A corresponding magnetic sensor 36 senses the position of the float 30, for example, using the Hall effect, and provides an electronic signal through a wiring harness to a controller and a gauge or display to provide a fluid level to a user during transmission 10 operation.

As the pump 22 operates and draws fluid from the sump 16 through the inlet 18, a vortex is formed within the sump 16 around the inlet or strainer 18. The vortex is illustrated using arrows in FIG. 2. The fluid in the vortex imparts a downward force, or downdraft, on the float 30 in the sensor assembly 28. The transmission fluid has a viscosity that is a function of the temperature of the fluid. In one example, the transmission fluid has an operating temperature range of −40 degrees Fahrenheit to 300 degrees Fahrenheit, with normal operating temperature during steady state operation targeted at approximately 220 degrees Fahrenheit. The kinematic viscosity of the fluid is 111,000 centiStoke (cSt) at −40 degrees Fahrenheit, 16 cSt at 220 degrees Fahrenheit, and 7 cSt at 300 degrees Fahrenheit. For reference, liquid water has a kinematic viscosity of approximately one centiStoke at room temperature.

When the fluid is colder, and the viscosity is higher, fluid in the vortex draws the float 30 down, such that the sensor 28 provides inaccurate or false readings on the fluid level, as the float may be below the surface of the fluid level in the sump. As the fluid heats with operation of the transmission, the viscosity decreases, and the downward forces on the float 30 from the vortex decrease or become negligible. If there is insufficient fluid within the transmission, or the transmission has a low fluid level, the operating temperature of the fluid increases, which eventually may lead to damage to various transmission 10 components such as gears or seals.

Based on the limited size of the sump 16, the strainer 18 and the sensor 28 are positioned relatively close to one another, and cannot be spaced sufficiently apart such that the vortex at the strainer 18 does not affect the operation of the sensor 28. In one example, a vertical plane at the inside edge of the sensor assembly 28 is approximately 0.5-1.0 centimeters from the closest vertical plane along an edge of the strainer 18.

Figure 3:
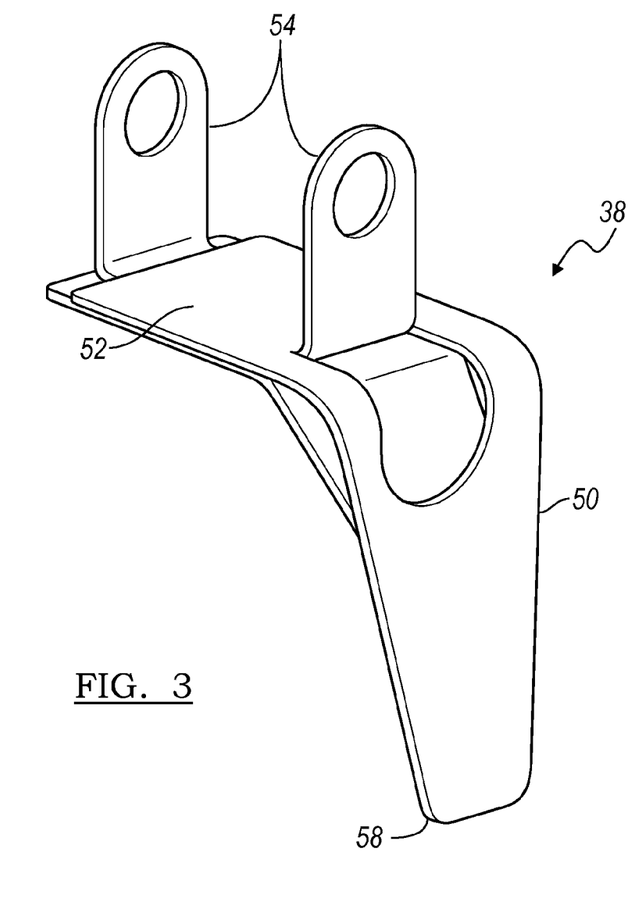
FIG. 3 is a shield for use with the transmission of FIG. 1 according to an embodiment.

In order to mitigate the effect of the vortex on the sensor assembly 28, a shield 38 or baffle is provided to at least partially surround the sensor assembly 28. The shield 38 also reduces sensor 28 error caused by turbulent fluid flow within the sump 16, fluid splash within the case 14, fluid aeration within the case 14, fluid slosh within the case 14, and the like. One example of a shield 38 is illustrated in FIGS. 2 and 3. Additionally, the sensor 28 and shield 38 may be positioned at approximately the fore/aft dynamic fluid volumetric centroid, during maximum operational incline and decline angles of the transmission 10, as shown in FIG. 1, where the fore/aft dynamic fluid volumetric centroid of the transmission 10 may be for the transmission 10 alone, or for the transmission 10 and an auxiliary transmission or other component sharing the sump 16.

The shield 38 forms a generally stagnant or semi-stagnant well within the main sump 16 by partitioning a region of the main sump 16 with a secondary sump 40. The shield 38 provides for a limited amount of fluid leakage between the main sump 16 and the secondary sump 40, with the fluid flowing between the shield 38 and the transmission case walls. The sump 16 is formed by a bottom wall 42 and side walls of the case 14, including walls 44, 48. The secondary sump 40 is formed by the bottom wall 42, side wall 44, intermediate wall 46, and side wall 48 that extends in the plane of FIG. 2 between the side wall 44 and the intermediate wall 46. The bottom wall 42, side wall 44, and side wall 48 form a corner region 49 together. The intermediate wall 46 extends outwardly from the side wall 48 into the sump 16 and may be cast with the case 14. The intermediate wall 46 is positioned between the strainer 18 and the sensor assembly 28.

Referring to FIGS. 2 and 3, the shield 38 is illustrated according to a first example. The shield 38 has panels 50, 52. The first and second panels 50, 52 may be generally planar, and are at an angle relative to one another. In one example, the one panel 50 is generally perpendicular to the other panel 52, although an acute or an obtuse angle may be formed between the two panels 50, 52. In one example, the shield 38 is formed from two or more separate sheets or pieces of material, such as metal or plastic, that are cut, bent, and connected to one another as shown in FIG. 3. In another example, the shield 38 may be formed as an integral piece, either from bent or otherwise formed metal, a metal casting, or from a plastic material, i.e. using injection molding, or the like.

The shield 38 is connected to the transmission 10, for example, to the case 14, or the like. In the example shown, the shield 38 is connected to a lubrication distribution tube 24 that passes over the sensor assembly 28. The shield 38 has mounting flanges 54 or other attachment features that connect to the tube 24.

The shield 38 is sized and shaped to fit closely next to the adjacent walls 42, 44, 46, 48 of the transmission such that it generally abuts the adjacent walls. By providing little clearance between the shield panels 50, 52 and the walls 42, 44, 46, 48, limited fluid is allowed to pass from the main sump 16 to the secondary sump 40 through gaps between the shield 38 and the transmission walls. One or more small gaps may be provided for fluid flow between the sumps 16, 40. With these small gaps, higher viscosity fluid generally does not flow across the shield 38 and into the sump 40, thereby creating a generally stagnant well for the sensor assembly 28 at low temperatures to reduce vortex effects. The low pressure vortex does not draw fluid from the well 40 and across the shield 38 into the main sump 16 until the fluid approaches a normal operating temperature and the viscosity is significantly lower, which lessens the effect of the vortex on the sensor 28. At lower viscosities, the downward force on the float 30 in the sensor 28 is reduced.

The shield 38 continues to act as a barrier and improve sensor 28 operation at normal fluid operating temperatures, as the fluid may still affect the sensor 28 due to slosh, splash, and aeration. Slosh, for example, may occur with sudden angular or attitude changes of the transmission 10 based on a sudden grade change, accelerations, or decelerations. Aeration occurs as fluid is flung from the gear mesh as droplets. Without the shield 38, the slosh and other fluid movements within the case 14 may provide error or false readings from the sensor 28.

The intermediate wall 46 has a curve 56 or radius formed where the wall 46 joins the bottom wall 42. Similarly, the panel 50 has a curve 58 along a lower edge of the panel 50 and adjacent to the bottom wall 42. By making the radius of curvature of the lower edge 58 of the panel less than the radius of curvature of the curve 56 of the intermediate wall, a gap 60 is provided between the panel and the case 14 that allows for a fluid passage from the main sump 16 into the secondary sump 40. This gap 60 may be on the order of 1-5 millimeters, or in a further example, is 1-2 millimeters. The gap 60 may be sized based on the spacing between the sensor assembly 28 and the strainer 18, with a larger gap 60 as the components are spaced further apart. The remainder of the panel 50 may have a closer fit with the housing 14 such that, except for the gap 60 region, the panel 50 may generally or approximately abut the housing 14. The top panel 52 may substantially cover the sensor 28 and extend to the wall 48 with a similar gap as gap 60. Alternatively, the panel 52 may only extend over a portion of the sump 40 region defined by the walls 44, 46, 48 and the panel 50 to reduce the effects of splash, etc. In one example, the panel 52 extends to cover approximately 60 percent of this region; however, other degrees of coverage are also envisioned.

FIGS. 4-7 illustrate another example of a shield for use with a level sensor in a transmission, and elements similar or the same as shown in FIGS. 1-3 are given the same reference numbers.

Figure 4:
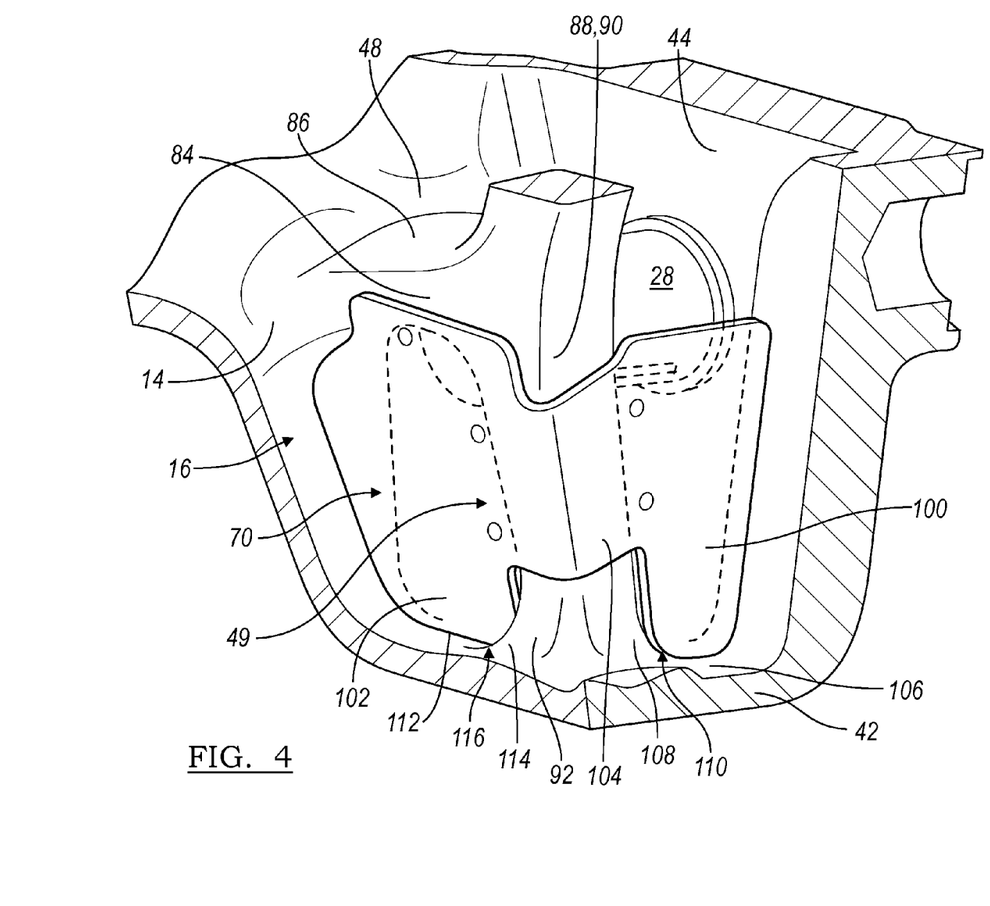
FIG. 4 is perspective view of a shield installed in a transmission according to another embodiment.
Figure 5:
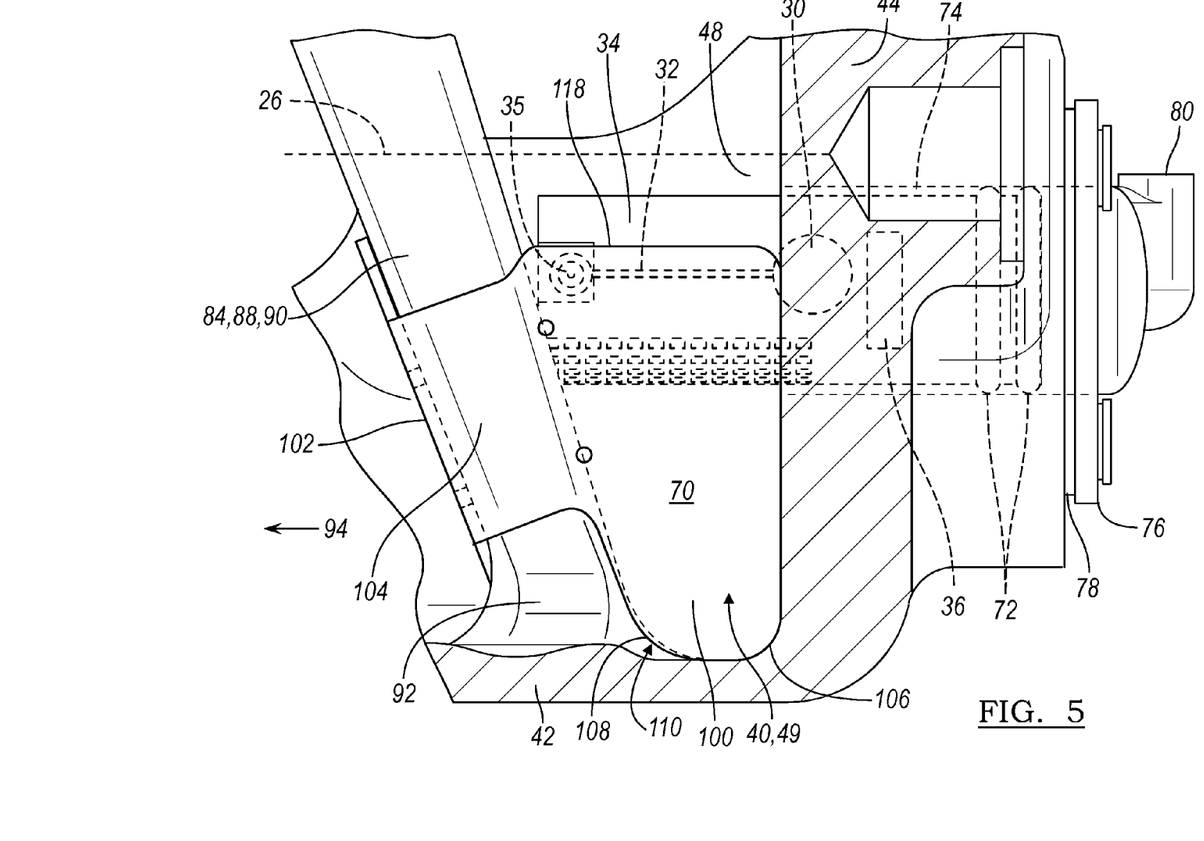
FIG. 5 is a side view of the shield of FIG. 4 in the direction of arrow 5.

Referring to FIGS. 4 and 5, a shield 70 is used with the sensor assembly 28 in the sump 16 of the transmission case 14. A corner region 49 is defined by the side walls 44, 48 and the bottom wall 42 of the transmission case 14. The sensor assembly 28 is supported by one of the side walls 44, 48, and is shown as being supported by side wall 44. An aperture or bore 74 is provided in the wall 44 for the sensor assembly 28 to extend through and into the sump 16. The float 30, pivot arm 32, and magnetic sensor 36 are illustrated as being contained within a sensor housing 34. The pivot arm rotates about axis 35. The magnetic sensor 36 is supported by the housing 34. The housing 34 has grooves and o-rings 72 that seal the housing with the bore 74 in the wall 44. The housing 34 has an external mounting flange 76 that fastens to the wall 44, for example, using bolts or the like. A gasket 78 is positioned between the wall 44 and the flange 76 to provide an additional sealing element. The mounting flange 76 has a connector 80 for a wiring harness to a controller.

An arch 84 or other intermediate structure or wall extends from the wall 48 to the bottom wall 42. The arch 84 is shown as having an opening formed underneath, although in other examples, this opening may be reduced in size or eliminated with a cast wall under the arch 84 when the case 14 is cast or formed.

The arch 84 has a first portion 86 and a second portion 88. The second portion 88 has a generally straight section 90 that the shield 70 may be connected to. The second portion 88 of the arch has a curve 92 or radius formed where the arch 84 connects to the bottom wall 42, with a corresponding radius of curvature. The radius of curvature of the curve 92 may be generally constant around the base of the arch 84, or may vary as is shown in FIG. 5.

The shield 70 and the corner region 49 define a generally stagnant or semi-stagnant well of the main sump 16 in an area surrounding the sensor assembly 28 to provide a secondary sump 40. The shield 70 acts as a barrier to a vortex formed by a suction strainer 18 or pump inlet as described above. The suction inlet is positioned adjacent to the arch 84 in the direction of arrow 94. The shield 70 also acts to reduce fluid splash, slosh, aeration and other turbulent fluid motion as described above.

Figure 6:
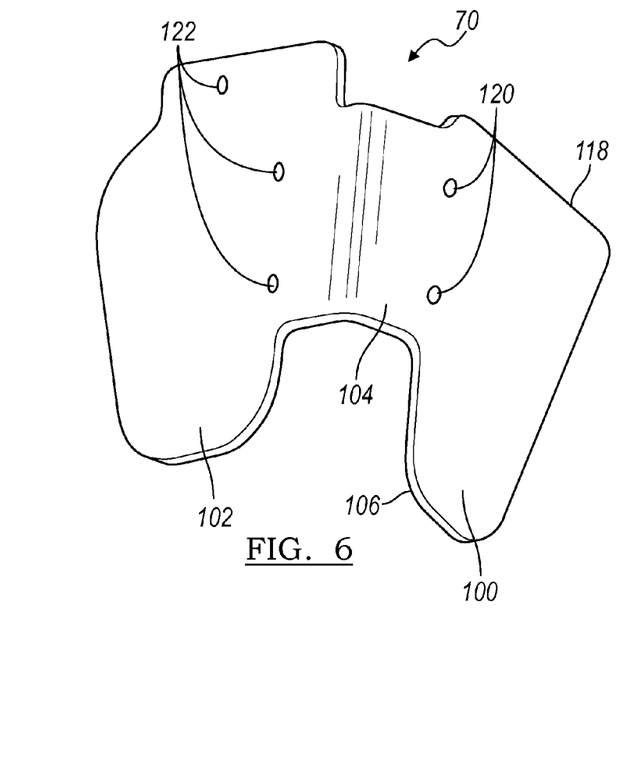
FIG. 6 is a perspective view of the shield of FIG. 4.
Figure 7:
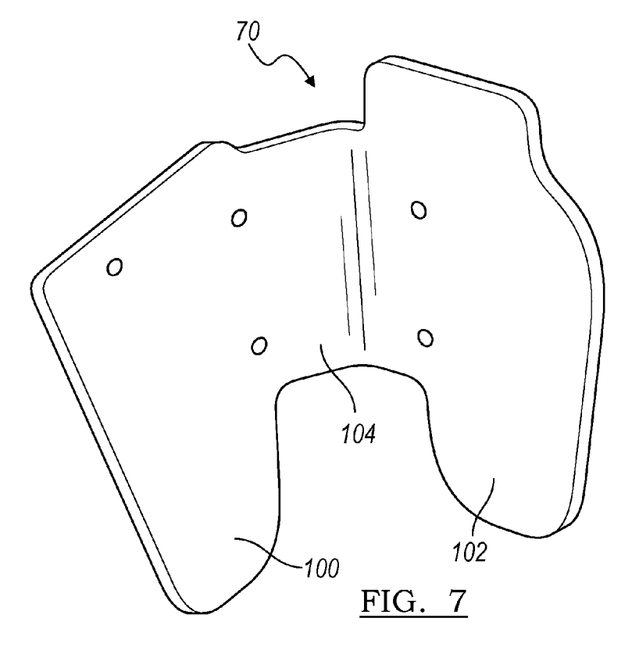
FIG. 7 is another perspective view of the shield of FIG. 6.

Referring to FIGS. 6-7, the shield 70 is provided with panels 100, 102. The panels 100, 102 are connected to one another. The panels 100, 102 are at an angle relative to one another, and in one example, are generally perpendicular to one another. The panels 100, 102 may be generally planar. In one example, the panels 100, 102 are connected by a neck or intermediate region 104. The intermediate region may be adapted to connect to the straight section 90 of the arch 84, or otherwise connect to the transmission case 14.

The panel 100 is sized to fit in and generally extend across a region defined by the arch 84, the side wall 44, and the bottom wall 42. The panel 102 is sized to fit in and generally extend across a region defined by the arch 84, the side wall 48, and the bottom wall 42. Gaps or passages may be provided between the panels 100, 102 and the adjacent walls 42, 44, 48 and arch 84 of the transmission case 14 provide passages for fluid flow from the main sump 16 to the secondary sump 40 and fluidly connect the secondary sump 40 with rest of the main sump 16.

The panel 100 has an edge 106 that is spaced apart from the radius 108 of the arch 84 to provide a passage for fluid flow between the main sump 16 and the secondary sump 40. The passage 110 is sized such that fluid flow through the passage is a function of viscosity, with fluid flow through the passage 110 being approximately zero at high viscosity, i.e. a low temperature threshold for transmission operation, and increasing fluid flow as the temperature of the fluid approaches a normal operating temperature. An edge 112 of the second panel 102 is spaced apart from a radius 114 to provide another passage 116 for fluid flow between the main sump 16 and the secondary sump 40.

Other than the passages 110, 116, the panels 100, 102 may be sized and positioned to be generally flush with or generally abut the walls 42, 44, 46 and the arch 84 of the transmission and/or extend over these elements to limit the fluid flow between the secondary sump 40 and the main sump 16. In other examples, additional passages may be provided by creating gaps at other locations. In the example shown in FIGS. 4-5, the passages 110, 116 provide approximately 1-2 millimeter spacing between the panels 100, 102 and the case 14, although other spacing is also anticipated.

In the example shown in FIG. 5, the upper edge 118 of the panel 100 is below the "full" fluid level 26 for the transmission 10, thereby allowing fluid to flow across the top of the panel 100 and into the sump 40 from the main sump 16. In other examples, the height of the panel 100 may be changed to increase or reduce fluid flow into the sump 40 from the main sump 16 based on the transmission 10 geometry. Similarly the top of the arch 84 may be positioned above or below the level 26 to control flow into and from the sump 40.

The shield 70 may be connected to the transmission case 14, to a distribution tube 24, or otherwise affixed within the transmission 10. In one example, the shield 70 has apertures 120 in the panel 100 and apertures 122 in the panel 102. The apertures 120, 122 may cooperate with lock wire or another fastening mechanism to attach the shield 70 to the arch 84 or case 14.

The shield 70 may be formed from various materials. In one example, the shield 70 is formed from sheet metal, and may be stamped or otherwise formed as an integral part. The sheet metal may be cut and bent to form the two panels 100, 102. In another example, the shield 70 may be formed from a plastic material, and may be injection molded, vacuum formed, or otherwise manufactured as an integral part. In further embodiments, the shield 70 may be partially cast or cast into the case 14, or the shield 70 may include multiple metal or plastic components that are assembled into a shield assembly for use with the transmission 10.

The shield 38, 70 provides a barrier to prevent the fluid vortex at the pump inlet from affecting the sensor assembly 28 at low temperature/high viscosity operating conditions. The shield 38, 70 enables the use of a float-type fluid level sensor 28 in the transmission fluid sump 16 of a twin countershaft transmission 10 or other transmission. Accurate readings from a float level sensor or switch may not be possible without the use of this device 38, 70.

This shield or device 38, 70 may be made of sheet or cast metal, but is not limited by material. This device 38, 70 may also be cast integral to the main case or could be molded or formed from plastic. This device 38, 70 is secured to the main case by lock wire but could be affixed by multiple other means or to other stationary transmission components.

Various embodiments of the present disclosure have associated, non-limiting advantages. For example, a sensor is positioned within a sump of the transmission to provide a signal corresponding to a transmission fluid level in the transmission to a user during operation. A shield having first and second panels is positioned around the sensor to provide a stagnant or semi-stagnant region or secondary sump in the sump about the sensor, thereby increasing sensor accuracy. The shield forms a gap with a wall of the transmission case to provide fluid flow from the main sump into the secondary sump. The gap may be sized such that fluid at low operating temperatures and high viscosity generally does not flow through the gap to reduce the effects of a vortex adjacent to the sensor and formed by a pump inlet. The shield may also be formed with perforations to regulate fluid flow. The shield reduces turbulence and sensor error caused by the vortex splash, slosh, and aeration.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A transmission comprising:
   a transmission case forming a main sump for transmission fluid having a corner region formed by a bottom wall, a first side wall and a second side wall of the case, the transmission case forming an intermediate wall that is spaced apart from the second side wall and extends outwardly from the bottom wall;
   a fluid level sensor assembly supported within the corner region by one of the first and second side walls of the case, the sensor assembly positioned between the intermediate wall and the second side wall;
   a pump inlet connected to the bottom wall and adjacent to the sensor assembly wherein the intermediate wall is positioned between the pump inlet and the sensor assembly; and
   a shield positioned within the main sump and having a first panel with an edge positioned adjacent to the bottom wall, the shield having a second panel connected to the first panel and opposed to the edge of the first panel, the second panel extending from the first panel towards the first side wall, wherein the sensor assembly is positioned between the first panel and the first side wall and between the second panel and the bottom wall;
   wherein the shield partitions a secondary sump into the main sump and surrounds the sensor assembly to decrease fluid motion adjacent to the sensor assembly, the secondary sump in fluid communication with the main sump by fluid flow between the shield and the case.

2. The transmission of claim 1 wherein the first and second panels substantially cover a volume defined by the first and second side walls, the intermediate wall, and the bottom wall.

3. The transmission of claim 1 wherein the shield reduces a force on a float in the fluid level sensor assembly by acting as a barrier between a sensor of the sensor assembly and a vortex formed by the pump inlet, the force being opposed to a buoyancy force of the float.

4. The transmission of claim 1 wherein the edge of the first panel is spaced apart from the bottom wall by a gap to provide fluid flow between the secondary sump and the main sump, wherein the gap is sized such that fluid flow through the gap is a function of viscosity, wherein fluid flow through the gap is approximately zero at a low temperature threshold for transmission operation.

5. The transmission of claim 1 wherein the first and second panels of the shield are generally perpendicular to one another.

6. The transmission of claim 1 further comprising a fluid distribution tube, wherein the shield is supported by the distribution tube; wherein the shield has at least one mounting flange extending from the second panel and adapted to connect to the distribution tube to support the shield.

7. The transmission of claim 1 wherein the sensor assembly and the shield are generally positioned at a fore/aft dynamic fluid volumetric centroid of the transmission.

8. A transmission comprising:
   a transmission case forming a main sump for transmission fluid having a corner region formed by a bottom wall, a first side wall and a second side wall of the case;
   a fluid level sensor assembly supported within the corner region by one of the first and second side walls of the case; and
   a shield positioned within the main sump and having a first panel with an edge positioned adjacent to the bottom wall, the shield having a second panel connected to the first panel and opposed to the edge of the first panel, the second panel extending from the first panel towards the first side wall, wherein the sensor assembly is positioned between the first panel and the first side wall and between the second panel and the bottom wall, wherein the edge of the first panel is spaced apart from the bottom wall by a gap to provide fluid flow between the secondary sump and the main sump, wherein the gap is sized such that fluid flow through the gap is a function of viscosity, wherein fluid flow through the gap is approximately zero at a low temperature threshold for transmission operation;

wherein the shield partitions a secondary sump into the main sump and surrounds the sensor assembly to decrease fluid motion adjacent to the sensor assembly, the secondary sump in fluid communication with the main sump by fluid flow between the shield and the case.

9. The transmission of claim 8 wherein the transmission case forms an intermediate wall extending outwardly from the bottom wall, the intermediate wall spaced apart from the second side wall; and wherein the sensor assembly is positioned between the intermediate wall and the second side wall.

10. The transmission of claim 9 wherein the first and second panels substantially cover a volume defined by the first and second side walls, the intermediate wall, and the bottom wall.

11. The transmission of claim 9 further comprising a pump inlet connected to the bottom wall and adjacent to the sensor assembly, the intermediate wall positioned between the pump inlet and the sensor assembly.

12. The transmission of claim 11 wherein the shield reduces a force on a float in the fluid level sensor assembly by acting as a barrier between a sensor of the sensor assembly and a vortex formed by the pump inlet, the force being opposed to a buoyancy force of the float.

13. A transmission comprising:

a transmission case forming a main sump for transmission fluid having a corner region formed by a bottom wall, a first side wall and a second side wall of the case;

a fluid level sensor assembly supported within the corner region by one of the first and second side walls of the case;

a shield positioned within the main sump and having a first panel with an edge positioned adjacent to the bottom wall, the shield having a second panel connected to the first panel and opposed to the edge of the first panel, the second panel extending from the first panel towards the first side wall, wherein the sensor assembly is positioned between the first panel and the first side wall and between the second panel and the bottom wall; and a fluid distribution tube, wherein the shield is supported by the distribution tube; wherein the shield has at least one mounting flange extending from the second panel and adapted to connect to the distribution tube to support the shield;

wherein the shield partitions a secondary sump into the main sump and surrounds the sensor assembly to decrease fluid motion adjacent to the sensor assembly, the secondary sump in fluid communication with the main sump by fluid flow between the shield and the case.

14. The transmission of claim 13 wherein the transmission case forms an intermediate wall extending outwardly from the bottom wall, the intermediate wall spaced apart from the second side wall; and wherein the sensor assembly is positioned between the intermediate wall and the second side wall.

15. The transmission of claim 14 wherein the first and second panels substantially cover a volume defined by the first and second side walls, the intermediate wall, and the bottom wall.

16. The transmission of claim 14 further comprising a pump inlet connected to the bottom wall and adjacent to the sensor assembly, the intermediate wall positioned between the pump inlet and the sensor assembly.

17. The transmission of claim 16 wherein the shield reduces a force on a float in the fluid level sensor assembly by acting as a barrier between a sensor of the sensor assembly and a vortex formed by the pump inlet, the force being opposed to a buoyancy force of the float.

* * * * *